US012085161B2

(12) United States Patent
Vasu et al.

(10) Patent No.: US 12,085,161 B2
(45) Date of Patent: Sep. 10, 2024

(54) VEHICLE DRIVELINE COMPONENT WITH WELDMENT HAVING AIR POCKET CONFIGURED TO SHIFT RESIDUAL STRESS IN WELDMENT AWAY FROM THE WELD JOINT

(71) Applicant: AMERICAN AXLE & MANUFACTURING, INC., Detroit, MI (US)

(72) Inventors: Anoop Vasu, Rochester Hills, MI (US); Shizhu Xing, Rochester Hills, MI (US); Jifa Mei, Ann Arbor, MI (US); Chih-Hung Chung, Troy, MI (US); Ravi S. Desai, Troy, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 1198 days.

(21) Appl. No.: 16/837,346

(22) Filed: Apr. 1, 2020

(65) Prior Publication Data

US 2021/0308806 A1 Oct. 7, 2021

(51) Int. Cl.

| | |
|---|---|
| ***B60B 35/00*** | (2006.01) |
| ***F16H 57/00*** | (2012.01) |
| *B23K 26/28* | (2014.01) |
| *B23K 101/00* | (2006.01) |
| *B23K 103/04* | (2006.01) |
| *B23K 103/06* | (2006.01) |

(52) U.S. Cl.

CPC .......... *F16H 57/0025* (2013.01); *B23K 26/28* (2013.01); *B23K 2101/008* (2018.08); *B23K 2103/04* (2018.08); *B23K 2103/06* (2018.08)

(58) Field of Classification Search

CPC ............... F16H 48/08; F16H 2048/385; B23K 2103/04; B23K 2103/06

USPC ........................................................ 301/126

See application file for complete search history.

(56) References Cited

U.S. PATENT DOCUMENTS

| | | | |
|---|---|---|---|
| 2,261,432 | A | 11/1941 | Cooke |
| 4,208,003 | A | 6/1980 | Meylan |
| 5,211,327 | A | 5/1993 | Clarke et al. |

(Continued)

FOREIGN PATENT DOCUMENTS

| | | | |
|---|---|---|---|
| DE | 1257793 | B | 1/1968 |
| EP | 1964641 | A1 | 9/2008 |
| JP | H0332476 | A | 2/1991 |

OTHER PUBLICATIONS

Extended European Search Report dated Sep. 24, 2020 for European application No. EP211664917, filed Apr. 1, 2021 (European family member of the present application).

(Continued)

*Primary Examiner* — Long T Tran
*Assistant Examiner* — James J Kim
(74) *Attorney, Agent, or Firm* — Reising Ethington P.C.

(57) ABSTRACT

A weldment includes a first component, a second component, and a weld joint coupling the first and second components together. The weld joint forms a heat affected zone in the first component and creates residual tensile stress in the first component. The first and second components cooperate to define a pocket configured to position a highest magnitude of the residual tensile stress in the first component in a location that is outside of the heat affected zone of the first component.

9 Claims, 4 Drawing Sheets

10 30 272 270 114 276 258 234 266 18 242 238 214 250 280 278 246 210 254 222 218 42 38 268 262 34 110 26 230 14 226 22

(56) References Cited

U.S. PATENT DOCUMENTS

| | | | | |
|---|---|---|---|---|
| 6,589,671 | B1 | 7/2003 | Kehrer | |
| 9,156,110 | B2 | 10/2015 | Chen et al. | |
| 9,212,704 | B2 | 12/2015 | Andonian et al. | |
| 10,391,861 | B2 * | 8/2019 | Richards | F16H 48/38 |
| 11,213,917 | B2 * | 1/2022 | Zhang | B23K 33/004 |
| 11,674,582 | B2 * | 6/2023 | Ono | F16H 48/40<br>475/220 |
| 2013/0195545 | A1 | 8/2013 | Tsuchida et al. | |
| 2016/0290466 | A1 * | 10/2016 | Yanase | F16H 48/40 |
| 2019/0203818 | A1 * | 7/2019 | Broker | F16H 55/06 |

OTHER PUBLICATIONS

European patent office communication dated Sep. 7, 2023 from counterpart foreign application EP 211664917, filed Apr. 1, 2021.

* cited by examiner 10
30
242
222
18
14

32
22
36
210
40
26
24

10
272
270
114
30
258
276
234
266
238
18
242
250

214
246
280
278
210
218
254
222
42
38
268
262
34
110
26
230
14
226
22

812
816
818
830
856
858
850
846
808
820
834
822
814
Controller
824
866
872
848
826
870
862
810

VEHICLE DRIVELINE COMPONENT WITH WELDMENT HAVING AIR POCKET CONFIGURED TO SHIFT RESIDUAL STRESS IN WELDMENT AWAY FROM THE WELD JOINT

FIELD

The present disclosure relates to a vehicle driveline component weldment and more specifically for a weldment having an air pocket.

BACKGROUND

The statements in this section merely provide background information related to the present disclosure and may not constitute prior art.

Welding two components together can create detrimental crack-opening stresses in the components due, at least in part, to the heating and cooling of the components near the weld joint. In some applications, these residual stresses can be concentrated within the fusion zone and heat affected zone of the weld joint. Such stresses may lead to cracking of the weld joint and/or the component within the heat affected zone, which may require the part to be scrapped or may shorten the useful life of the weldment.

In U.S. Pat. No. 9,156,110, a weldment is described having an isolation pocket 44 to reduce weld-induced distortion. Referring to FIGS. 1 and 4 of U.S. Pat. No. 9,156,110, the first component 12 is disposed about a journal portion JP of the second component 14. The weld 16 is shown as being disposed about the axis 100 and penetrating axially a penetration distance PD to a symmetric cavity. In order to relieve weld-induced stress, the first component 12 defines a pocket 44 that is entirely radially outward of the weld 16 by a distance S and open through an axial end 46 of the first component 12. The annular collar portion 50 deflects about the base 52 radially inwardly and shrinks freely in the axial direction as the weld 16 cools.

In U.S. Pat. No. 5,211,327, referring to FIG. 4 of U.S. Pat. No. 5,211,327, a weldment is described in which the shaft 116 includes an annular notch blunting slot 126 and the disc 112 has a cylindrical bore defined by surface 118 that is aligned with the weld joint 114. Air is vented from the slot 126 via passageways 128. In order to relieve weld-induced stress, the disc 112 defines an annular groove 124 that is entirely radially outward of the weld joint 114 and is open through an axial end of the disc 112. The annular groove 124 allows the annular ligament 122 to flex during weld solidification.

In U.S. Pat. No. 6,589,671, a gearwheel 2 is shown for welding to a housing 1. Referring to FIGS. 1 and 2 of U.S. Pat. No. 6,589,671, the housing 1 has a first surface 3 which is in line with the weld interface and surface 7 of the gearwheel 2 and remains inline therewith up to the cylindrical locating surface 5. The gearwheel 2 has a cylindrical locating surface 8 that fits matingly with the cylindrical locating surface 5 of the housing 1. The gearwheel 2 has a widened section 9 that is spaced apart from the locating surface 5 proximate to the weld interface at surface 7.

In U.S. Publication No. 2019/0203818, a ring gear 150 is welded to a case 110. Referring to FIG. 1 of U.S. 2019/0203818, a cavity is formed in area 106 radially inward of the weld 104. The cavity is defined by grooves in the ring gear 150 and a weld ring 130 of the case 110 that extend axially similar distances from the weld 104 and are shaped similarly proximate to the weld 104 such that flanges 136 and 154 both thicken with increased axial distance from the weld 104, starting immediately adjacent to the weld 104. Furthermore, the weld ring 132 of the case 110 is a material that has a similar ductility to the ring gear 150 and is cast about the more ductile flange 112 of the case 110 to avoid cracking during the welding process.

While weldments such as these may be suitable for some applications, there exists room for improvement and such weldments may experience issues in other applications. The present disclosure addresses these and other issues with typical weldments.

SUMMARY

This section provides a general summary of the disclosure and is not a comprehensive disclosure of its full scope or all of its features.

In one form, a weldment includes a first component, a second component, and a weld joint coupling the first and second components together. The weld joint forms a heat affected zone in the first component and creates a residual tensile stress in the first component. The first and second components cooperate to define a pocket configured to position a highest magnitude of the residual tensile stress in the first component in a location that is outside of the heat affected zone of the first component. According to a variety of alternate forms: the first component is formed of a first material and the second component is formed of a second material, the first material having a lower ductility than the second material; the first component is cast iron and the second component is steel; the pocket is an annular shaped pocket disposed about an axis; the first component is configured to rotate about an axis and the second component is a gear disposed about the axis; the weld joint penetrates in a penetration direction that is parallel to the axis; the first component includes a first flange and the second component includes a second flange, the weld joint joining the first and second flanges, the first flange having an axial thickness that decreases with increased radial distance from the weld joint; the weld joint penetrates in a penetration direction that is perpendicular to the axis; the first component includes a first flange and the second component includes a second flange, the weld joint joining the first and second flanges, the first flange having a radial thickness that decreases with increased axial distance from the weld joint; the first component defines a first groove that is recessed from the weld joint in a direction away from the second component, wherein the second component defines a second groove that is recessed from the weld joint in a direction away from the first component, the first and second grooves defining the pocket, wherein the first groove extends further toward an exterior of the weld joint than the second groove; the first component includes a first flange and the second component includes a second flange, the weld joint being a butt-weld between the first and second flanges, the weld joint penetrating in a first direction, the first flange having a thickness in the first direction that decreases with increased distance from the weld joint; the weld joint penetrates from an exterior of the weldment to the pocket; the first component includes a first interior surface that transitions to a first corner of the pocket, the first corner of the pocket being located outside of the heat affected zone of the weld joint; the weldment is employed in a vehicle driveline component.

In another form, a weldment includes a first component, a second component, and a weld joint. The first component includes a first flange disposed about an axis. The first flange includes a first exterior surface and a first interior surface.

The second component includes a second flange. The second flange includes a second exterior surface and a second interior surface. The first and second interior surfaces cooperate to at least partially define a pocket of the weldment. The weld joint couples the first and second flanges. A thickness between the first interior surface and the first exterior surface decreases with increased distance from the weld joint. According to a variety of alternate forms: a root of the weld joint is disposed at or in the pocket; the first component is formed of a first material and the second component is formed of a second material, the first material having a lower ductility than the second material; the second flange is disposed radially about the first flange; the weldment is employed in a vehicle driveline component.

In yet another form, a weldment includes a first component and a second component. The first component is disposed about an axis and includes a first flange. The first flange has a first surface. The second component is disposed about the axis and includes a second flange. The second flange has a second surface that abuts the first surface to define a weld joint interface between the first and second flanges. The first and second components cooperate to define a pocket disposed about the axis and adjacent to the weld joint interface such that the weld joint interface extends in a weld penetration direction from an exterior of the first and second components to the pocket. The first flange has a first thickness between the exterior and the pocket at a first location proximal to the weld joint interface and a second thickness between the exterior and the pocket at a second location distal to the weld joint interface. The second thickness is less than the first thickness. According to a variety of alternate forms: the first flange includes a first side that partially defines the pocket, wherein a portion of the first side is neither perpendicular to nor parallel with the weld joint interface; the portion of the first side is frustoconical in shape; the weld joint interface is parallel to and disposed coaxially about the axis; the weldment is employed in a vehicle driveline component.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
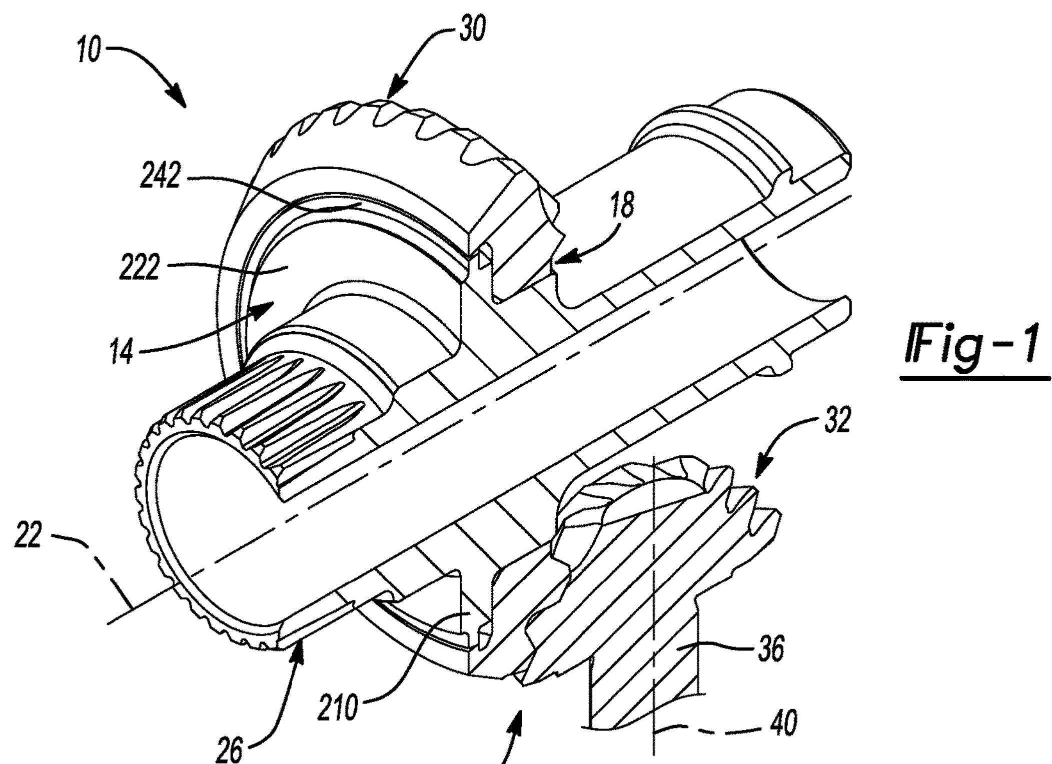
FIG. 1 is a perspective cross-sectional view of a portion of a vehicle driveline component in accordance with the teachings of the present disclosure, illustrating a weldment in a pre-welded assembled state.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, an example weldment 10 is illustrated in a pre-welded assembled state. The weldment 10 includes a first component 14 and a second component 18 configured to be welded to the first component 14. The first component 14 is disposed about an axis 22 and configured to rotate about the axis 22. The second component 18 is disposed about the axis 22 and also configured to rotate about the axis 22. In the example provided, the first component 14 is a portion of a shaft 26 that is disposed about the axis 22 and the second component 18 is a portion of a gear 30 disposed about the axis 22. The first component 14 and the second component may be the same material or may be different materials. In one configuration, the first and second components 14, 18 are both steel of a similar composition. In another configuration, the first component 14 is a more brittle material (i.e., more stiff or less ductile material) than the second component 18. For example, the first component 14 may be a steel or other alloy having a higher carbon content than the second component 18, which may also be a type of steel or other metal. In another example, the first component 14 is cast iron and the second component 18 is steel.

The shaft 26 and gear 30 may be used in any suitable device, but in the example provided the shaft 26 and gear 30 are part of a vehicle driveline component 24 that also includes a pinion gear 32. The gear 30 is configured to meshingly engage the pinion gear 32, which is coupled to a pinion shaft 36 for rotation about a pinion axis 40, the pinion axis 40 being transverse to the axis 22. Some non-limiting examples of driveline applications in which the driveline component 24 may be a part include a vehicle transmission, a power take off unit, a transfer case, or a rear drive module. While the first component 14 is referred to herein as a portion of the shaft 26 and the second component 18 is referred to herein as a portion of the gear 30, the first and second components 14, 18 may alternatively be portions of different types of rotational bodies. In one alternative configuration, not specifically shown, the first component 14 can be a part of a differential case configured for rotation about the axis 22. The differential case (not shown) can support a differential gearset (not shown) for rotation about the axis 22. The second component 18 may be a gear (not specifically shown, e.g., similar to the gear 30) and configured to be welded to the first component 14 of the differential case (not shown) such that torque applied to the second component 18 can be transmitted via the differential gearset (not shown) to a pair of outputs (not shown, e.g., output gears or output shafts of the differential).

Figure 2:
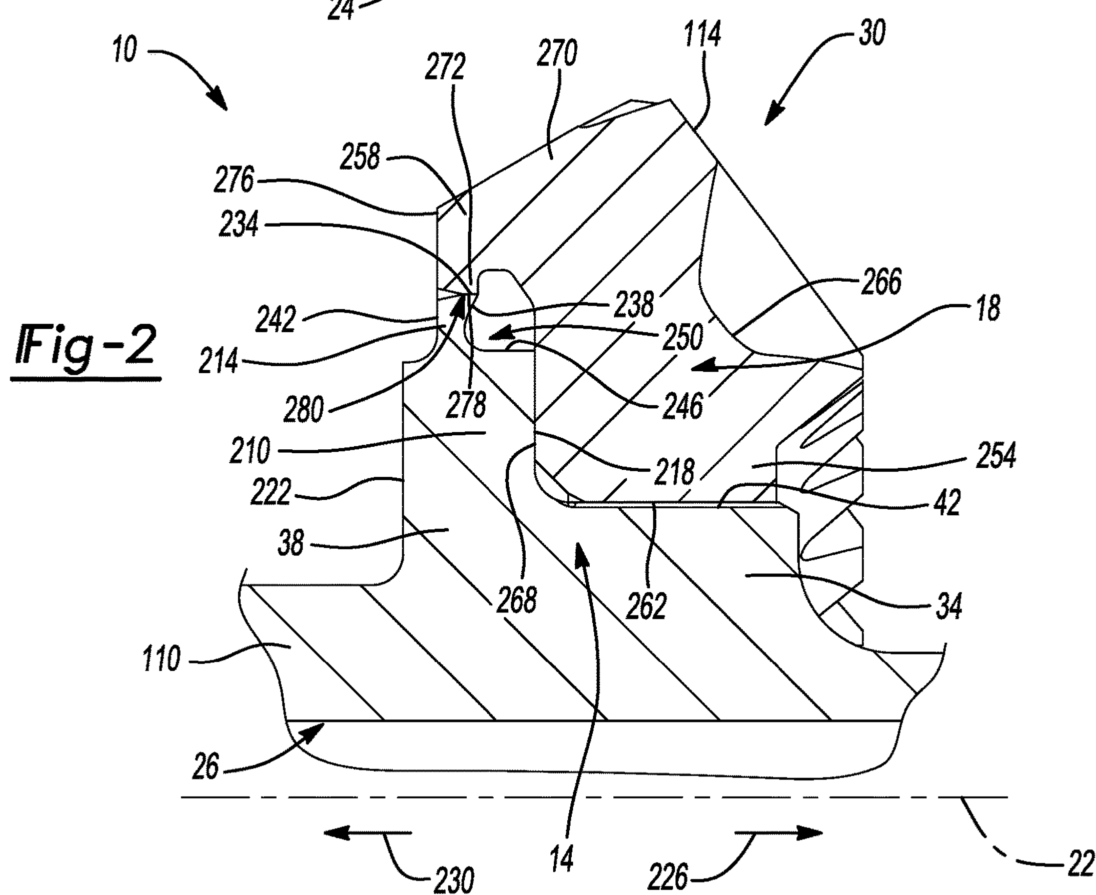
FIG. 2 is a cross-sectional view of a portion of the weldment of FIG. 1.

Referring to FIG. 2, the first component 14 includes a first base 34 and a first flange 38 disposed about the axis 22. The first base 34 has a radially outward perimeter 42. In the example provided, the perimeter 42 is a cylindrical surface, facing radially outward, and coaxially disposed about the axis 22, though other configurations can be used. In one non-limiting alternative, the perimeter 42 may have rotationally locating features (not shown) such as one or more splines, one or more grooves, or one or more flats for example for engagement with the second component 18.

The first flange 38 extends radially outward from the first base 34. The first flange 38 includes a first body portion 210 and a first lip portion 214. The first body portion 210 extends radially outward from the first base 34 and extends circumferentially about the axis 22. The first lip portion 214 extends radially outward from the first body portion 210 and extends circumferentially about the axis 22. In the example provided, the first body portion 210 includes a first side 218 and a second side 222. The first side 218 is proximate to the perimeter 42 of the first base 34 and faces generally in a first axial direction 226. The second side 222 is opposite the first side 218 and faces generally in a second axial direction 230. The first side 218 may be generally perpendicular to the perimeter 42, though other configurations can be used.

The first lip portion 214 has a first weld joint face 234, a first side 238, and a second side 242. In the example provided, the first weld joint face 234 faces radially outward and is parallel to and coaxially disposed about the axis 22. The second side 242 faces in the second axial direction 230 and is an exterior surface of the first lip portion 214. The second side 242 may be flush with the second side 222 of the first body portion 210 (e.g., as shown in FIG. 2) or may be axially offset therefrom (e.g., as shown in FIG. 1), though other configurations can be used (e.g., angled relative to each other). The first side 218 faces generally in the first axial direction 226 and transitions into an outward perimeter 246 of the first body portion 210 to define a first groove 250 in the first flange 38 as described in greater detail below.

As described above, the shaft 26 of the example provided includes the first component 14. In the example provided, the shaft 26 includes a tubular body 110. The first component 14 is fixedly coupled to the tubular body 110 at the first base 34 for common rotation about the axis 22. The first component 14 may be integrally formed with the tubular body 110 or may be attached (e.g., welded) thereto. In the example provided, the tubular body 110 extends in both axial directions 226, 230 from the first component 14, though other configurations can be used, such as extending only in one axial direction 226 or 230 therefrom.

The second component 18 includes a second base 254 and a second flange 258. The second base 254 is disposed coaxially about the first base 34. The second base 254 has a radially inward wall 262 that is configured to matingly engage the outward perimeter 42 of the first base 34. In the example provided, the wall 262 is a cylindrical shape configured to be press-fit onto the perimeter 42 of the first base 34, though other configurations can be used.

As described above, the second component 18 is a portion of the gear 30 in the example provided. In the example provided, the second component 18 is integrally formed with the gear 30. In the example provided, the gear 30 is a spiral bevel gear such that teeth 114 of the gear 30 are helical and face generally at an angle in the first axial direction 226 and generally extend from a first side 266 of the second base 254, though other configurations can be used such as the gear 30 being a different type of gear or have different tooth geometry. Some non-limiting examples include spur gear teeth, dog teeth, and hypoid teeth.

In the example provided, a second side 268 of the second base 254 opposes and contacts the first side 218 of the first body portion 210. The second base 254 extends radially outward of the first flange 38.

The second flange 258 extends from the second base 254. In the example provided, the second flange 258 extends axially in the second axial direction 230 from the second side 268 of the second base 254. The second flange 258 is disposed coaxially about the first flange 38. The second flange 258 includes a second body portion 270 and a second lip portion 272.

The second body portion 270 extends generally in the second axial direction 230 from the second base 254. In the example provided, the second body portion 270 includes a second side 276 that may be axially aligned with the second side 242 of the first lip portion 214, though other configurations can be used. The second side 276 is an exterior surface of the second body portion 242. The second lip portion 272 extends radially inward from the second body portion 270 to a second weld joint face 278. The second weld joint face 278 faces generally radially inward and opposes the first weld joint face 234 such that they cooperate to define a weld joint interface 280 disposed coaxially about the axis 22. The second weld joint face 278 and the first weld joint face 234 may be in direct contact before welding along the weld joint interface 280.

Figure 3:
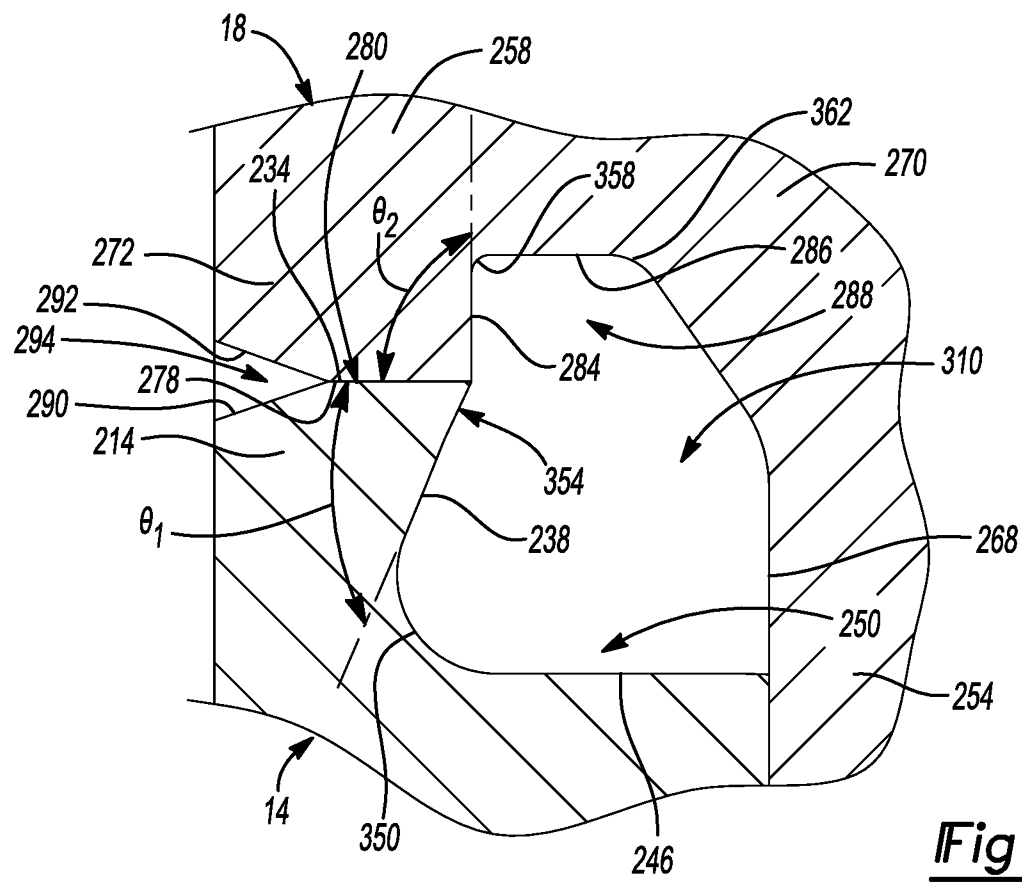
FIG. 3 is a cross-sectional view of a portion of the weldment of FIG. 1, illustrating a pocket in accordance with the teachings of the present disclosure.

Referring to FIG. 3, the second lip portion 272 has a first side 284 that faces generally in the first axial direction 226 (FIG. 2) and transitions into a face 286 of the second body portion 270 that generally faces radially inward to define a second groove 288 in the second flange 258 as described in greater detail below. In the example provided, the first lip portion 214 and the second lip portion 272 are each chamfered (i.e., at chamfers 290 and 292 respectively). The chamfers 290, 292 cooperate to define a weld groove 294 that is open toward the second axial direction 230 (FIG. 2) and aligned with the weld joint interface 280. In the example provided, the weld groove 294 is a V-shaped groove, though other configurations may be used.

The first groove 250 and the second groove 288 cooperate to define an air-pocket 310. In the example provided, the second side 268 of the second base 254 also defines part of the boundary of the pocket 310. The pocket 310 is an annular void formed when the first and second components 14, 18 are in an assembled position (shown). The pocket 310 is disposed coaxially about the axis 22 (shown in FIGS. 1 and 2). In the example provided, the pocket 310 is completely enclosed such that it is fully encapsulated by the first and second components 14, 18. The pocket 310 is asymmetrical across the weld joint interface 280. In other words, the first groove 250 is a different size and/or shape than the second groove 288. In the example provided, the pocket is asymmetrical with respect to opposite sides of a plane (not specifically shown) that is coplanar with the weld joint interface 280.

Figure 4:
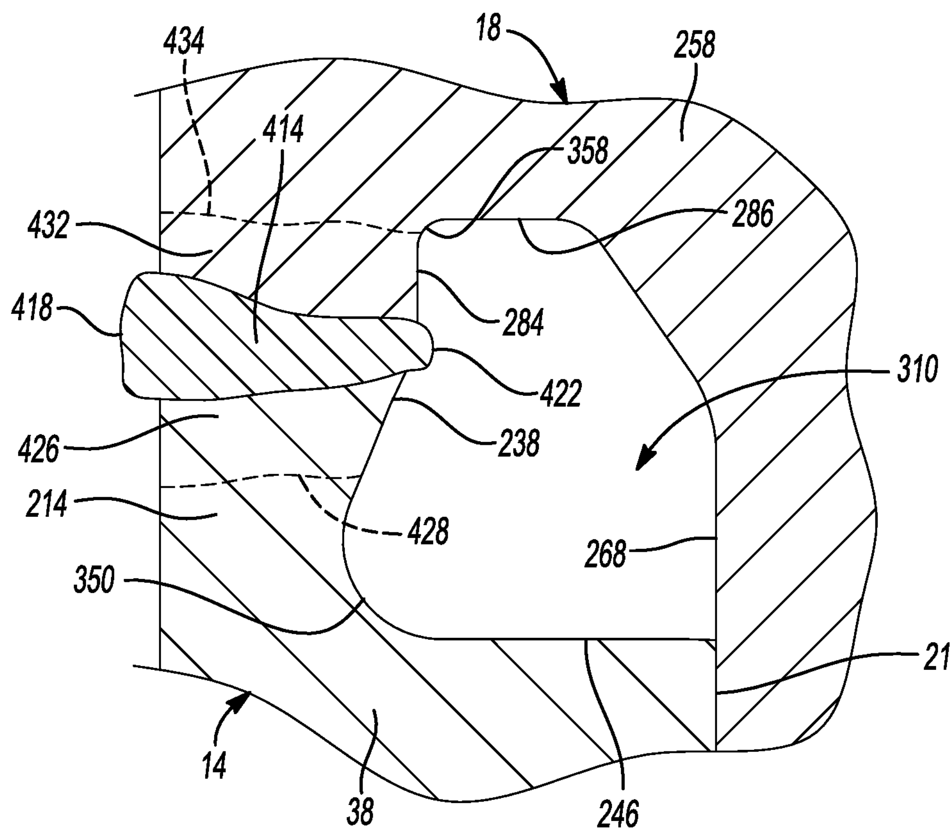
FIG. 4 is a cross-sectional view similar to FIG. 3, illustrating the weldment in a welded state in accordance with the teachings of the present disclosure.

Referring to FIGS. 3 and 4, when the first and second components 14, 18 are assembled as shown in FIG. 3, they can be welded along the weld joint interface 280. FIG. 4 illustrates an example of a weld joint 414 formed by welding along the weld joint interface 280. In other words, the weld joint 414 is formed when the first and second components 14, 18 are welded together over at least a portion of the weld joint interface 280—the weld joint 414 including a chemical bond, i.e. a weld, that spans across the weld joint interface 280 (or a portion thereof) to fixedly couple the two components 14, 18 to one another. In the example provided, the weld joint 414 is a circumferential butt-weld. An exterior 418 (e.g., a crown) of the weld joint 414 fills the weld groove 294 (shown in FIG. 3) and an interior 422 (e.g., a root) of the weld joint 414 is disposed proximate to the pocket 310. In the example provided, the weld joint 414 is a full penetration weld such that the interior 422 of the weld joint 414 extends up to or slightly into the pocket 310. In the example provided, the weld joint 414 is a laser weld, though other types of welds (e.g., arc-weld or friction weld) can be used. In the example provided, the weld joint 414 penetrates axially.

The first component 14 has a heat affected zone 426 of the weld joint 414 that is schematically illustrated by the annular region between dashed line 428 and the weld joint 414. The second component has a heat affected zone 432 of the weld joint 414 that is schematically illustrated by the annular region between dashed line 434 and the weld joint 414. The heat affected zones 426, 432 as referred to herein are the areas of the base materials (i.e., the first component 14 or the second component 18 respectively) which was not melted but had its microstructure and properties altered by the heating and re-cooling of the welding process.

The heating and re-cooling as a result of welding can cause detrimental residual stresses to form, such as tensile residual stresses, in the first and second flanges 38, 258 next to the heat affected zones 426, 432. This residual stress can be due, in part, to temperature gradients from non-uniform cooling and the compliance of the first and second flanges 38, 258. This compliance can be due to factors such as the shape, thickness, material properties, and geometry of the first and second flanges 38, 258. The asymmetrical shape of the pocket 310 is configured specifically to position the highest magnitude tensile residual stress, due to this heating and re-cooling, in a location (i.e., a first corner 350 of the pocket 310) that is located outside of the heat affected zone 426 for the first component 14. For example, the high magnitude tensile stress levels may approach or exceed the yield stress of the material of the heat affected zone 426.

The first side 238 of the first lip portion 214 is an interior surface that transitions into the first corner 350 of the pocket 310. In the example provided, the first corner 350 is rounded (e.g., a fillet) and may have a constant radius or a complex radius. The first corner 350 transitions into the perimeter 246. In the example provided, the perimeter 246 faces generally radially outward and extends axially from the first corner 350 to the first side 218. The first corner 350 is disposed radially outside of the heat affected zone 426 to move any high magnitude tensile residual stress in the first component 14 to outside of the heat affected zone 426.

Referring to FIG. 3, the first side 238 can have a portion 354 that is neither perpendicular to nor parallel with the weld joint interface 280. In the example provided, the portion 354 forms an angle $\theta_1$ (theta$_1$) relative to the first weld joint face 234 (i.e., relative to the weld joint interface 280) such that the portion 354 is frustoconical in shape. In the example provided, the portion 354 begins transitioning into the first corner 350 outside of the heat affected zone 426 (FIG. 4). The angle $\theta_1$ (theta$_1$) is less than or equal to 90°.

In the example provided, the angle $\theta_1$ (theta$_1$) is less than 90° such that the axial thickness of the first lip portion 214 decreases with increased distance from the first weld joint face 234 until the first corner 350. In the example provided, the reduction in thickness increases the compliance of the first lip portion 214 so that any high magnitude tensile residual stress is moved to the first corner 350 outside of the heat affected zone 426.

In the example provided, the first side 284 of the second lip portion 272 defines an angle $\theta_2$ (theta$_2$) with the second weld joint face 278 that is equal to 90°. In an alternative configuration, not specifically shown, angle $\theta_2$ (theta$_2$) can be less than 90°. In one, non-limiting example of such a configuration, the stiffness of the second component 18 is also high, the angle $\theta_2$ (theta$_2$) may optionally be equal to angle $\theta_1$ (theta$_1$) and the pocket may optionally be symmetric across the weld joint interface 280.

Returning to the example provided in FIG. 3, the first side 284 of the second lip portion 272 is an interior surface that transitions into a second corner 358 of the pocket 310. In the example provided, the second corner 358 is rounded (e.g., a fillet) and may have a constant or complex radius. The second corner 358 transitions into the face 286. In the example provided, the face 286 is generally parallel to the second weld joint face 278 about the axis 22 (FIGS. 1 and 2), though other configurations can be used. The face 286 extends in the first axial direction 226 from the second corner 358 to a third corner 362 of the pocket 310. The third corner 362 may be rounded (e.g., a fillet) to transition from the face 286 to the second side 268.

The radial height of the first lip portion 214 is greater than the radial height of the second lip portion 272. In other words, the depth of the first groove 250 (i.e., radial distance from the first weld joint face 234 to the perimeter 246) is greater than the depth of the second groove 288 (i.e., radial distance from the second weld joint face 278 to the face 286). In the example provided, the first side 284 of the second lip portion 272 transitions to the second corner 358 within the heat affected zone 432 (FIG. 4). In an alternative configuration, not specifically shown, the first side 284 of the second lip portion 272 transitions to the second corner 358 outside the heat affected zone 432 (FIG. 4).

Figure 5:
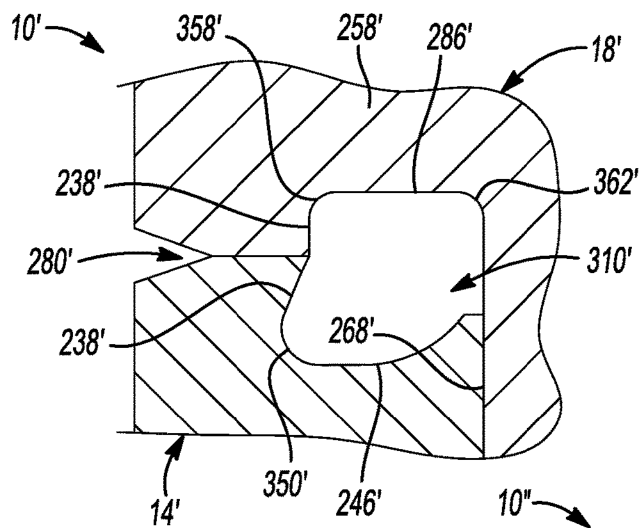
FIG. 5 is cross-sectional view of a portion of a weldment of a second configuration in accordance with the teachings of the present disclosure.

Referring to FIG. 5, a weldment 10' of a second configuration is illustrated in a pre-welded state. The weldment 10' is similar to the weldment 10 (FIGS. 1-4) except as otherwise shown or described herein. Features of the weldment 10' denoted by primed reference numerals are similar to those features of the weldment 10 (FIGS. 1-4) denoted by similar non-primed reference numerals. In this particular example, the first corner 350' transitions to the perimeter 246' but the perimeter 246' can curve or transition in the direction generally toward the second flange 258' (e.g., the radially outward direction) as it approaches the second side 268' of the second component 18'.

Figure 6:
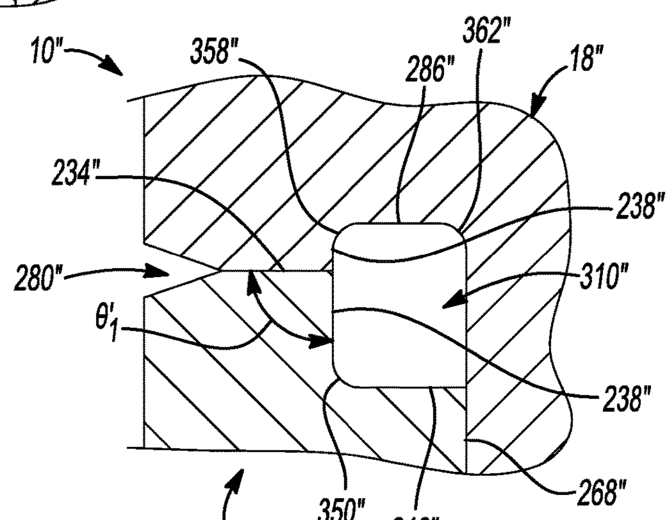
FIG. 6 is cross-sectional view of a portion of a weldment of a third configuration in accordance with the teachings of the present disclosure.

Referring to FIG. 6, a weldment 10" of a third configuration is illustrated in a pre-welded state. The weldment 10" is similar to the weldment 10 (FIG. 1-4) or 10' (FIG. 5) except as otherwise shown or described herein. Features of the weldment 10" denoted by double primed reference numerals are similar to those features of the weldment 10 (FIGS. 1-4) denoted by similar non-primed reference numerals or of weldment 10' (FIG. 5) denoted by similar primed reference numerals. In this particular example, the angle $\theta'_1$ (theta'$_1$) is 90°.

Figure 7:
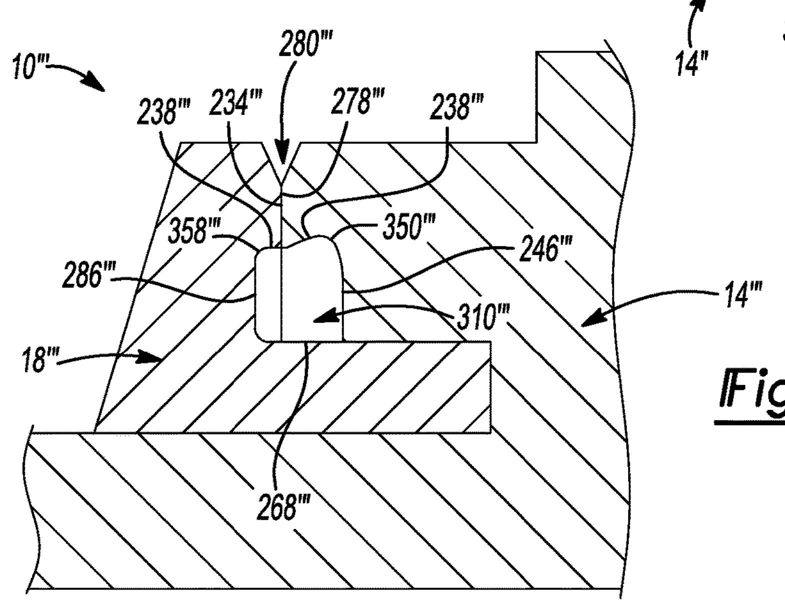
FIG. 7 is a cross-sectional view of a portion of a weldment of a fourth configuration in accordance with the teachings of the present disclosure.

Referring to FIG. 7, a weldment 10''' of a fourth configuration is illustrated in a pre-welded state. The weldment 10''' is similar to the weldment 10 (FIG. 1-4) or 10' (FIG. 5) or the weldment 10" (FIG. 6) except as otherwise shown or described herein. Features of the weldment 10''' denoted by triple primed reference numerals are similar to those features of the weldment 10 (FIGS. 1-4) denoted by similar non-primed reference numerals or of weldment 10' (FIG. 5)

denoted by similar primed reference numerals or of weldment 10" (FIG. 6) denoted by similar double primed reference numerals. In this particular example, the weldment 10'" is configured to rotate about an axis 710 such that the second weld joint face 278'" faces axially in a first axial direction 714 and the first weld joint face 234'" faces axially in a second axial direction 718. The weld joint faces 234'" and 278'" are perpendicular to and disposed about the axis 710. In the particular example provided, the weld (not specifically shown) penetrates radially.

A weldment (e.g., weldment 10, 10', 10", or 10'") constructed in accordance with the teachings of the present disclosure can be employed in a vehicle driveline component such as an axle assembly, a torque transfer device, a rotary coupling, a transfer case, or a power take-off unit, for example.

Figure 8:
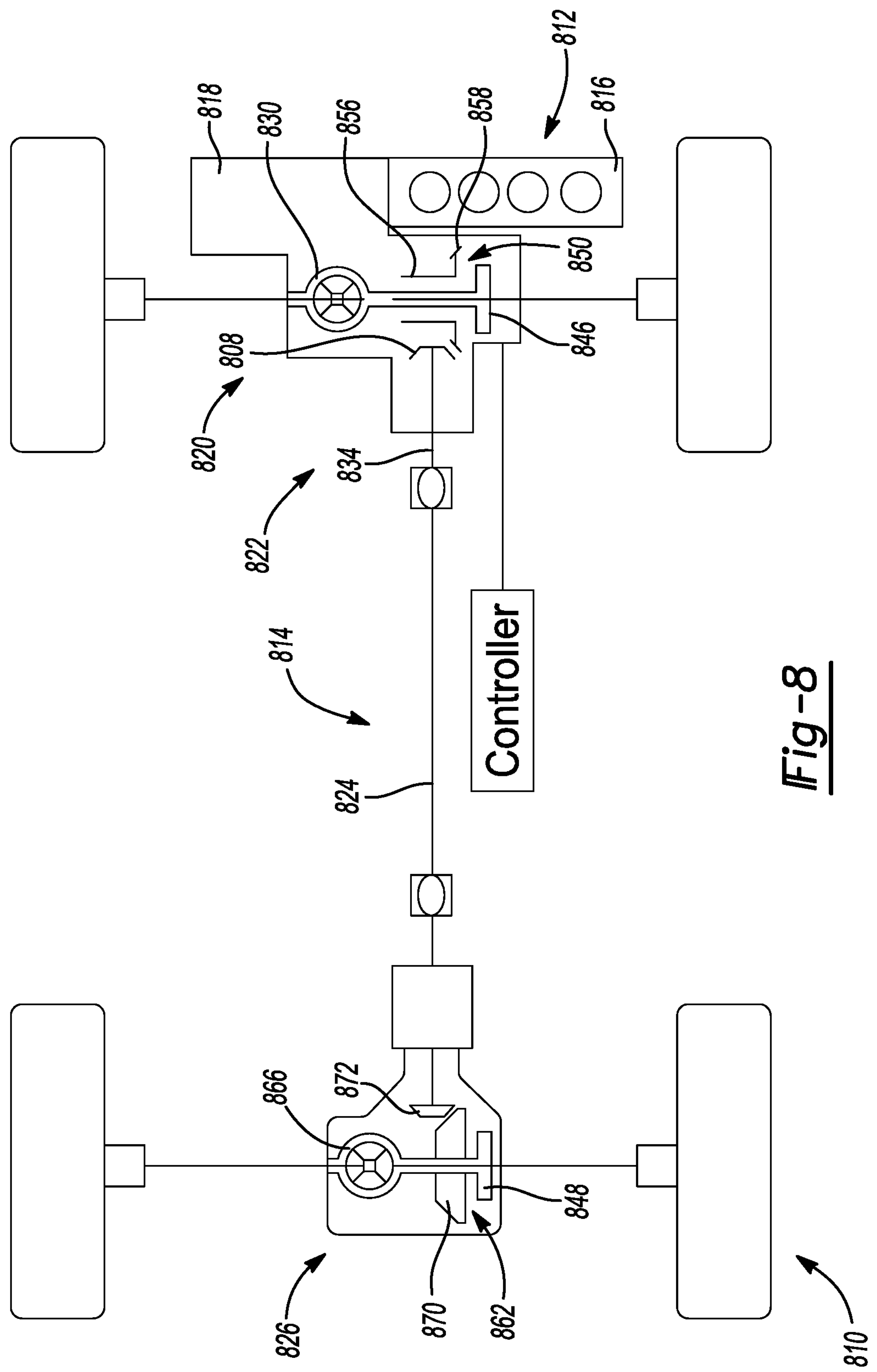
FIG. 8 is a schematic view of an example vehicle including drive one or more driveline components in accordance with the teachings of the present disclosure.

Referring to FIG. 8, such a weldment constructed in accordance with the present disclosure is illustrated in a driveline environment. In this example, an exemplary vehicle having one or more driveline components constructed in accordance with the teachings of the present disclosure is generally indicated by reference numeral 810. The vehicle 810 can have a power train 812 and a drive line or drive train 814. The power train 812 can be conventionally constructed and can comprise a power source 816 and a transmission 818. The power source 816 can be configured to provide propulsive power and can comprise an internal combustion engine and/or an electric motor, for example. The transmission 818 can receive propulsive power from the power source 816 and can output power to the drive train 814. The transmission 818 can have a plurality of automatically or manually-selected gear ratios.

The drive train 814 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations. The drive train 814 can include a front drive module 820, a power take-off unit (PTU) 822, a propshaft 824 and a rear drive module 826.

The front drive module 820 can be configured in any desired manner, such as a front beam axle or an independent front drive axle. An output (not specifically shown) of the transmission 818 can be coupled to an input (not specifically shown) of the front axle assembly 820 to drive an input member of the front axle assembly 820. In the particular example provided, the front drive module 820 includes a front differential assembly and the output of the transmission 818 drives a front differential case 830 of the front differential assembly. Thus, the differential case 830 is also referred to herein as the input member 830. The PTU 822 can receive rotary power from the input member 830 of the front drive module 820 and can selectively transmit rotary power to a PTU output member 834. The PTU output member 834 can transmit rotary power to the prop shaft 824, which can couple the PTU output member 834 to the rear drive module 826 such that rotary power output by the PTU 822 is received by the rear drive module 826.

The rear drive module 826 can be configured in any desired manner, such as a rear beam axle, an independent rear drive axle, or a rear drive module. The front drive module 820 can be driven on a full-time basis while the rear drive module 826 can be driven on a part-time basis. As such, the drive train 814 can include one or more clutches to interrupt the transmission of rotary power through a part of the drive train 814. In the particular example provided, the drive train 814 includes a first actuation system or clutch 846, which can be configured to interrupt the transmission of rotary power through the PTU 822, and a second clutch 848, which can be configured to halt rotation of components within the rear drive module 826.

In the example provided, the PTU 822 can include a weldment 850 that can be similar to the weldments 10, 10', 10", 10'" described above. The weldment 850 includes a first component (similar to the first component 14, 14', 14", 14'") and a second component (similar to the second component 18, 18', 18", 18'"). The first component can be part of an intermediate spindle 856 configured to received input torque from the clutch 846. The second component can be part of a ring gear 858 meshingly engaged with a pinion gear 860 of the PTU output member 834.

The rear drive module 826 may additionally or alternatively include a weldment 862 in accordance with the teachings of the present disclosure. In this particular example, the weldment 862 includes a first component (similar to the first component 14, 14', 14", 14'") coupled for rotation with an input such as the rear differential case 866 and a second component (similar to the second component 18, 18', 18", 18'") that is part of a ring gear 870. The ring gear 870 is meshingly engaged with a pinion gear 872 that receives torque from the propshaft 824.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle driveline component comprising:

a first component formed of cast iron, the first component having a first annular flange that is disposed an axis, the first annular flange having a first lip with a first axial side and a second axial side that is opposite the first axial side;

a second component formed of steel, the second component having a second annular flange that is disposed about the axis concentric with the first annular flange, the second annular flange abutting the first annular flange, the second annular flange having a second lip with a third axial side and a fourth axial side that is opposite the third axial side; and a weld coupling abutting edges of the first and second lips to one another, the weld extending along a first plane from the first and third sides of the first and second lips, respectively, to the second and fourth sides of the first and second lips, respectively;

wherein the first component and the second component cooperate to define a pocket, the pocket having a first pocket side, which intersects the weld and which includes the first and third axial sides, a first peripheral surface and a first corner, the first peripheral surface and the first corner being defined by the first component, the first corner connecting the first axial side and the first peripheral surface; and wherein the first corner of the pocket is located outside of a heat affected zone in the first component.

2. The vehicle driveline component of claim 1, wherein the weld is disposed nominally about an annular plane between the first and second lip portions, and wherein a dimension between the first and second axial sides of the first lip portion taken parallel to the annular plane decreases with increasing distance away from the annular plane along at least a segment of the first axial side of the first lip portion.

3. The vehicle driveline component of claim 2, wherein the dimension between the first and second axial sides decreases at a rate that is proportional to a change in the distance from the annular plane.

4. The vehicle driveline component of claim 2, wherein the annular plane is perpendicular to the axis.

5. The vehicle driveline component of claim 1, wherein the weld extends fully from the first and third sides of the first and second lips, respectively, to the second and fourth sides of the first and second lips, respectfully.

6. The vehicle driveline component of claim 1, wherein the pocket has a second peripheral surface and a second corner that are defined by the second component, the second corner connecting the first axial side and the second peripheral surface.

7. The vehicle driveline component of claim 6, wherein a transition between the second corner and the third axial side is disposed within a heat affected zone in the second component.

8. The vehicle driveline component of claim 6, wherein a length of the first side between the first corner and the weld is greater than a length of the third side between the second corner and the weld.

9. The vehicle driveline component of claim 1, wherein the first component defines a first groove that is recessed from the weld joint in a direction away from the second component, wherein the second component define a second groove that is recessed from the weld joint in a direction away from the first component, the first and second grooves cooperating to define the pocket, wherein the first corner is formed at a 90 degree angle;

wherein the second corner includes a second peripheral surface and a second corner that connects the third axial side to the second peripheral surface, wherein the second corner is formed at a 90 degree angle; and wherein a depth of the first groove is greater than a depth of the second groove.

* * * * *